United States Patent [19]

Treybig

[11] Patent Number: 4,946,911
[45] Date of Patent: Aug. 7, 1990

[54] EPOXY RESIN AND WATER BORNE COATINGS THEREFROM

[75] Inventor: Duane S. Treybig, Lake Jackson, Tex.

[73] Assignee: The Dow Chemical Company, Midland, Mich.

[21] Appl. No.: 354,948

[22] Filed: May 22, 1989

[51] Int. Cl.$^5$ .................. C08G 59/44; C08G 59/45
[52] U.S. Cl. ........................... 525/514; 528/104; 528/111; 528/113; 528/117; 528/322; 528/45
[58] Field of Search ................ 525/514; 528/104, 45, 528/111, 113, 117, 322

[56] References Cited

U.S. PATENT DOCUMENTS

| | | | |
|---|---|---|---|
| 3,875,113 | 4/1975 | Lefebvre et al. | 528/117 |
| 3,956,241 | 5/1976 | Steele et al. | 260/47 EC |
| 3,962,182 | 6/1976 | Steele et al. | 260/47 EN |
| 4,029,561 | 6/1977 | McGinniss | 204/181 |
| 4,037,018 | 7/1977 | McGinniss | 428/418 |
| 4,164,487 | 8/1979 | Martin | 260/29.2 EP |
| 4,212,781 | 7/1980 | Evans et al. | 260/29.4 UA |
| 4,283,521 | 8/1981 | Jones | 528/322 X |
| 4,294,743 | 10/1981 | Graham | 528/117 X |
| 4,294,877 | 10/1981 | Graham | 528/117 X |
| 4,374,214 | 2/1983 | Holub et al. | 528/117 X |
| 4,467,072 | 8/1984 | Smith | 525/117 |
| 4,579,916 | 4/1986 | Schmid et al. | 528/117 X |
| 4,721,742 | 1/1988 | Bertram et al. | 523/417 |
| 4,816,531 | 3/1989 | Young | 528/117 X |
| 4,837,295 | 6/1989 | Drain et al. | 528/322 X |
| 4,847,348 | 7/1989 | Fischer et al. | 528/117 |

Primary Examiner—Earl Nielsen

[57] ABSTRACT

Curable compositions comprising a curing agent and the product resulting from reacting (I) the product resulting from the free radical polymerization of (A) the composition resulting from (1) reacting (a) a compound containing an average of more than one vicinal epoxide group per molecule with (b) at least one unsaturated imide having a reactive hydrogen atom attached to the imide nitrogen atom in amounts which provide a ratio of moles of component (b) per epoxide group contained in component (a) of from about 0.01:1 to about 1.1:1; and (2) optionally, reacting the product of step (A) with (c) at least one of (i) at least one compound containing only one phenolic hydroxyl group, (ii) at least one secondary amine, or (iii) a combination of (i) and (ii) in amounts sufficient that the resulting product contains a percent epoxide value of not greater than about 1.5 percent by weight; and (B) a mixture of (d) at least one polymerizable monomer containing only one polymerizable ethylenically unsaturated group and only one carboxyl group per molecule (e) at least one polymerizable monomer containing only one polymerizable ethylenically unsaturated group per molecule and which is free of carboxyl groups; and (II) at least one of (f) at least one primary, secondary or tertiary amine; (g) at least one alkali metal hydroxide, alkali metal carbonate or alkali metal bicarbonate; or (h) any combination of (f) and (g); and wherein component (II) is present in an amount sufficient to render the resultant composition water miscible, water soluble or water dispersable.

51 Claims, No Drawings

EPOXY RESIN AND WATER BORNE COATINGS THEREFROM

FIELD OF THE INVENTION

The present invention concerns epoxy resins containing grafted polymers, cured products thereof and water borne coatings.

BACKGROUND OF THE INVENTION

Epoxy resins have been employed as excellent base resins for coating compositions. They have also been modified so as to render them water miscible or dispersable so as to enable coatings to be prepared which contain relatively small amounts or else do not contain any organic solvents which must be either collected or vented to the atmosphere as a result of their evolution during curing. Either of these is undesirable.

It would therefore be desirable to have available epoxy base resins which are water soluble, miscible or dispersable which when employed in coatings formulations result in coatings having desirable properties without the disadvantages of emitting organic solvents during cure.

SUMMARY OF THE INVENTION

One aspect of the present invention pertains to an uncured composition which is the composition resulting from
(1) reacting
  (a) a compound containing an average of more than one vicinal epoxide group per molecule with
  (b) at least one unsaturated imide having a reactive hydrogen atom attached to the imide nitrogen atom
  in amounts which provide a ratio of moles of component (b) per epoxide group contained in component (a) of from about 0.01:1 to less than about 1:1; and
(2) reacting the product of step (A) with
  (c) at least one of
    (i) at least one compound containing only one phenolic hydroxyl group,
    (ii) at least one secondary amine, or
    (iii) a combination of (i) and (ii)
    in an amount sufficient that the resulting product contains a percent epoxide value of not greater than about 1.5 percent by weight.

Another aspect of the present invention pertains to an uncured composition which is the product resulting from the free radical polymerization of
(A) the composition resulting from
  (1) reacting
    (a) a compound containing an average of more than one vicinal epoxide group per molecule with
    (b) at least one unsaturated imide having a reactive hydrogen atom attached to the imide nitrogen atom
    in amounts which provide a ratio of moles of component (b) per epoxide group contained in component (a) of from about 0.01:1 to about 1.1:1; and
  (2) optionally, reacting the product of step (A) with
    (c) at least one of
      (i) at least one compound containing only one phenolic hydroxyl group,
      (ii) at least one secondary amine, or
      (iii) a combination of (i) and (ii)
    in an amount sufficient that the resulting product contains a percent epoxide value of not greater than about 1.5 percent by weight; and
(B) a mixture of
  (d) at least one polymerizable monomer containing only one polymerizable ethylenically unsaturated group and only one carboxyl group per molecule
  (e) at least one polymerizable monomer containing only one polymerizable ethylenically unsaturated group per molecule and which is free of carboxyl groups;
wherein component (A) is present in an amount of from about 25 to about 95, preferably from about 50 to about 90, more preferably from about 70 to about 85 percent by weight based upon the combined weight of components (A) and (B); component (B) is present in an amount of from about 75 to about 5, preferably from about 50 to about 10, more preferably from about 30 to about 15 percent by weight based upon the combined weight of components (A) and (B); component (d) is present in an amount such that the resultant composition has a percent acid by weight based upon the combined weight of components (A) and (B) of from about 1 to about 30, preferably from about 2 to about 15, more preferably from about 3 to about 8 using 45 as the acid equivalent weight; and component (e) is present in an amount of from about 4 to about 75, preferably from about 8 to about 48, more preferably from about 12 to about 27 percent by weight based upon the combined weight of components (A) and (B).

Another aspect of the present invention pertains to an uncured composition which is the product resulting from reacting
(I) the product resulting from the free radical polymerization of
  (A) the composition resulting from
    (1) reacting
      (a) a compound containing an average of more than one vicinal epoxide group per molecule with
      (b) at least one unsaturated imide having a reactive hydrogen atom attached to the imide nitrogen atom
      in amounts which provide a ratio of moles of component (b) per epoxide group contained in component (a) of from about 0.01:1 to about 1.1:1; and
    (2) optionally, reacting the product of step (A) with
      (c) at least one of
        (i) at least one compound containing only one phenolic hydroxyl group,
        (ii) at least one secondary amine, or
        (iii) a combination of (i) and (ii)
        in an amount sufficient that the resulting product contains a percent epoxide value of not greater than about 1.5 percent by weight; and
  (B) a mixture of
    (d) at least one polymerizable monomer containing only one polymerizable ethylenically unsaturated group and only one carboxyl group per molecule
    (e) at least one polymerizable monomer containing only one polymerizable ethylenically unsaturated group per molecule and which is free of carboxyl groups;
  wherein component (A) is present in amounts of from about 25 to about 95, preferably from about 50 to about 90, more preferably from about 70 to about 85 percent by weight based upon the combined weight of components (A) and (B); component (B) is present in amounts of from about 75 to about 5, preferably from about 50 to about 10, more preferably from about 30 to about 15 percent by weight based upon the combined weight of components (A) and (B); component (d) is present in an amount such that the resultant composition has a percent acid by weight based upon the combined weight of components (A) and (B) of from about 1 to about 30, preferably from about 2 to about 15, more preferably from about 3 to about 8 using 45 as the acid equivalent weight; and component (e) is present in an amount of from about 4 to about 75, preferably from about 8 to about 48, more preferably from about 12 to about 27 percent by weight based upon the combined weight of components (A) and (B); and (II) at least one of
  (f) at least one primary, secondary or tertiary amine;
  (g) at least one alkali metal hydroxide, alkali metal carbonate or alkali metal bicarbonate; or
  (h) any combination of (f) and (g); and
wherein component (II) is present in an amount sufficient to render the resultant composition water miscible, water soluble or water dispersable.

A further aspect of the present invention pertains to a curable composition comprising any of the aforementioned compositions and a curing amount of at least one curing agent therefor.

A still further aspect of the present invention pertains to the product resulting from curing the aforementioned curable compositions.

DETAILED DESCRIPTION OF THE INVENTION

The term uncured as employed herein means that the product is not an insoluble, infusable product but rather it is a product which is soluble in at least one solvent such as water or organic solvent such as, aliphatic, aromatic, or halogenated aliphatic hydrocarbons, ketones, glycol ethers, cyclic ethers, amides, sulfones, and the like. The product is fusable in that it has a melting point or range and will therefore melt before decomposing.

The epoxy containing compounds and imides are reacted at any suitable temperature at which the reaction will proceed at a reasonable rate and in the presence of a suitable catalyst. Particularly suitable such temperatures is from about 80° C. to about 250° C., more suitably from about 125° C. to about 200° C., most suitably from about 130° C. to about 170° C. At temperatures below about 80° C., the reaction is unsatisfactorily slow. In some epoxy resins, the imide may be insoluble at temperatures below about 100° C. and thus will not appreciably react. In addition, at these temperatures, the mixture may be too viscous for effective mixing. At temperatures above about 250° C., an excess molecular weight increase of the polymer can occur from the undesirable reaction between epoxy groups and hydroxyl group of the modified resin.

The reaction is suitably carried out for a time of from about 0.025 to about 4, more suitably from about 0.1 to about 2, most suitably from about 0.5 to about 1 hour(s). Higher reaction temperatures require less time than do lower reaction temperatures.

The imide is employed in an amount which provides a ratio of moles of imide to vicinal epoxy group suitably from about 0.01:1 to about 1.1:1, particularly suitable from about 0.01:1 to about 0.9:1, more suitably from about 0.1:1 to about 0.45:1, most suitably from about 0.1:1 to about 0.25:1.

The reaction between the epoxy compound and the imide compound should be reacted under conditions and reactant ratios which will not result in a product which is a gel. By the term "gel" it is meant that the resultant product is a high molecular weight product which is insoluble in water and organic solvent. A gel marks the point where processing flexibility ends.

If desired, the reaction can be conducted in the presence of one or more suitable solvents such as, for example aliphatic hydrocarbon, aromatic hydrocarbons, alcohols, glycol ethers, aliphatic hydrocarbons, aromatic hydrocarbons, halogenated aliphatic hydrocarbons, glycol ethers, ketones, amides, sulfones, cyclic ethers, any combination thereof and the like. Particularly suitable such solvents include, for example, 2-butoxyethanol, dipropylene glycol methyl ether, diethylene glycol monobutyl ether, diethylene glycol methyl ether, acetone, cyclohexanone, butanol, ethanol, propanol, xylene, any combination thereof and the like.

The reaction between the epoxy groups of the epoxy resin and the imide can be conducted in the presence of one or more catalysts such as, for example, phosphines, quaternary ammonium compounds, phosphonium compounds, tertiary amines and the like. Particularly suitable catalysts include, for example, ethyltriphenylphosphonium chloride, ethyltriphenylphosphonium bromide, ethyltriphenylphosphonium iodide, ethyltriphenylphosphonium diacetate (ethyltriphenylphosphonium acetate.acetic acid complex), ethyltriphenylphosphonium phosphate, tetrabutylphosphonium chloride, tetrabutylphosphonium bromide, tetrabutylphosphonium iodide, tetrabutylphosphonium diacetate (tetrabutylphosphonium acetate.acetic acid complex), tetrabutylphosphonium phosphate.phosphoric acid complex, butyltriphenylphosphonium tetrabromobisphenate, butyltriphenylphosphonium bisphenate, butyltriphenylphosphonium bicarbonate, benzyltrimethylammonium chloride, tetramethylammonium hydroxide, triethylamine, tripropylamine, tributylamine, 2-methylimidazole, benzyldimethylamine, mixtures thereof and the like. Many of these catalysts are described in U.S. Pat. Nos. 3,306,872; 3,341,580; 3,379,684; 3,477,990; 3,547,881; 3,637,590; 3,843,605; 3,948,855; 3,956,237; 3,962,182; 4,048,141; 4,093,650; 4,131,633; 4,132,706; 4,171,420; 4,177,216 and 4,366,295, all of which are incorporated herein by reference in their entirety.

The catalyst is employed in any quantity which will effectively catalyze the reaction. Particularly suitable such quantities include, for example, from about 0.0001 to about 10, more suitably from about 0.05 to about 1, most suitably from about 0.1 to about 0.5 percent by weight based on the weight of the epoxy resin.

The imide can be added to the epoxy resin by any of two different methods. The first method involves dissolving the imide in a suitable solvent and adding this solution to the epoxy resin at room temperature and then heating to a temperature of from about 100° C. to about 130° C. and blending the components with a suitable catalyst. A particularly suitable solvent for dissolving the imide is a glycol ether such as, for example, 2-butoxyethanol. The second method involves adding the imide by itself or in admixture with a suitable solvent to a mixture of epoxy resin and solvent at a temperature of from about 100° C. to about 130° C. The catalyst can be added separately to the mixture, or it can be premixed with the imide or imide-solvent mixture.

The epoxy containing compounds resulting from reacting an epoxy containing compound with an unsaturated imide and a secondary amine are reacted at any suitable temperature at which the reaction will proceed at a reasonable rate. Particularly suitable such temperature is from about 25° C. to about 200° C., more suitably from about 60° C. to about 150° C., most suitably from about 80° C. to about 125° C. At temperatures below about 60° C., the mixture becomes too viscous for adequate mixing. At temperatures above about 150° C., the tertiary amine species from the reaction of the secondary amine with the epoxy group of the epoxy resin catalyzes side reactions, notably epoxy-alcohol and epoxy-epoxy reactions. The side reactions increase molecular weight and viscosity up to and including gellation.

The reaction is suitably carried out for a time of from about 0.025 to about 8, more suitably from about 0.05 to about 2, most suitably from about 0.25 to about 1 hour(s). Higher reaction temperatures require less time than do lower reaction temperatures.

The epoxy containing compounds resulting from reacting an epoxy containing compound with an unsaturated imide and a compound containing only one phenolic hydroxy group in the presence of an aforementioned catalyst are reacted at any suitable temperature at which the reaction will proceed at a reasonable rate. Suitable temperatures are from about 50° C. to about 280° C., particularly from about 100° C. to about 240° C., more suitably from about 120° C. to about 220° C. and most suitably from about 120° C. to about 180° C. The reaction is conducted for a time period which is sufficient to complete the reaction; however, suitable times of from about 0.025 to 24, particularly from about 0.05 to 5, more suitably from about 0.1 to 2 and most suitably from about 0.25 to 1 hour(s) can be employed. Higher reaction temperatures require less time than do lower reaction temperatures. For example, nonylphenol is completely reacted with an epoxy containing compound in the presence of ethyl triphenylphosphonium phosphate within fifteen minutes at 170° C. while more than two hours reaction time is required at 150° C. The reaction time is also dependent on the choice of catalyst. For example, the nonylphenol reaction with an epoxy containing compound is about 85% complete after about 5 minutes and 100% complete after about 1 hour at 150° C. in the presence of a tetrabutylphosphonium acetate.acetic acid complex while the reaction requires more than two hours with ethyl triphenylphosphonium phosphate at 150° C.

The product from the reaction of the compound containing one phenolic hydroxy group, the unsaturated imide and the epoxy containing compound can be prepared in a one step or a two step process. The one step process comprises blending the compound containing one phenolic hydroxy group and the unsaturated imide together and reacting the blend with the epoxy containing compound. The compound containing one phenolic hydroxy group and the unsaturated imide may be dissolved in a suitable solvent. A suitable solvent is any solvent which solubilizes the unsaturated imide and the compound containing one phenolic hydroxy group. Alcohol and ethers are examples of suitable solvents. Particularly suitable solvents are 2-butoxyethanol, butanol and the like. The two step process involves either (a) reacting the epoxy containing compound with the compound containing one phenolic hydroxy group and then reacting the resulting reaction product with the unsaturated imide or (b) reacting the epoxy containing compound with the unsaturated imide and then reacting the resulting reaction product with the compound containing one phenolic hydroxy group.

The compound containing only one phenolic hydroxyl group or a secondary amine or a combination thereof is employed in an amount which is sufficient to produce a compound containing a percent epoxide value of less than 1 percent by weight.

Suitable compounds having an average of more than one vicinal epoxide group per molecule which can be employed herein include the epoxy resins disclosed by P. H. Martin in U.S. Pat. No. 4,164,487 which is incorporated herein by reference in its entirety. Particularly suitable such epoxy resins include the di- and polyglycidyl ethers of compounds having an average of more than one aromatic hydroxyl group per molecule. The preferred epoxy resins include the diglycidyl ethers of polyhydric phenols and bisphenols such as for example, catechol, hydroquinone, resorcinol, bisphenol A, bisphenol F, bisphenol K, bisphenol S, combinations thereof and the like. Suitable also are the halogenated and alkyl derivatives thereof. The diglycidyl ethers of bisphenol A are preferred. Also suitable are the polyglycidyl ethers of cardanol-phenol bisphenol, the polyglycidyl ethers of the phenolaldehyde resole and novolac resins, the polyglycidyl ethers of the halogen or alkyl substituted phenolaldehyde resole or novolac resins of which the phenolformaldehyde and cresol-formaldehyde novolac resins are preferred.

The imide compounds suitable for use herein are those having an active hydrogen atom attached to the imide nitrogen atom and a polymerizable ethylenically unsaturated group such as, for example, maleimides (1H-pyrrole-2,5-diones), 2,6(1H,3H)-pyridinediones, dihydrophthalimides, and tetrahydrophthalimides (tetrahydro-1H-iso-indole-1,3(2,H)-diones) are examples of such imides.

Suitable 1H-pyrrole-2,5-diones (maleimides) and 2,6(1H,3H)-pyridinediones which can be employed include those represented by the following formulas I or II

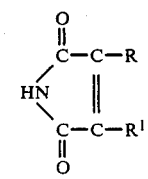

Formula I

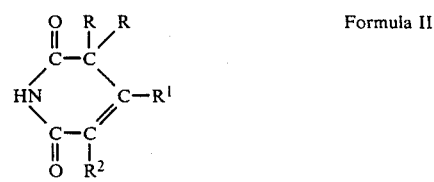

Formula II wherein each R, $R^1$ and $R^2$ are independently hydrogen or a group which does not substantially inhibit free radical polymerization such as, for example, a halogen, particularly chlorine or bromine, or an alkyl group having from 1 to about 4 carbon atoms, mixtures thereof and the like. Particularly suitable 1H-pyrrole-2,5-diones and 2,6(1H,3H)-pyridinediones are 1H-pyrrole-2,5-diones (or maleimide), 3-methyl-1H-pyrrole-2,5-dione, 3-chloro-1H-pyrrole-2,5-dione, 3,4-dimethyl-1H-pyrrole-2,5-dione, 2,6(1H,3H)-pyridinedione and the like.

Suitable tetrahydro-1H-insoindole-1,3(2H)diones (tetrahydrophthalimides) which can be employed include those represented by the following formulas III, IV, V or VI,

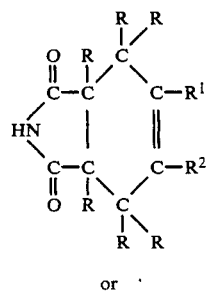

Formula III or

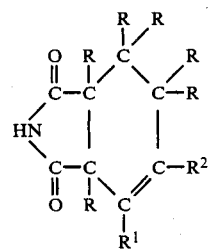

Formula IV or

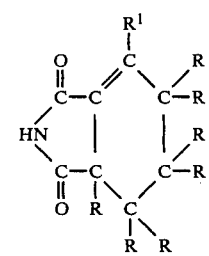

Formula V

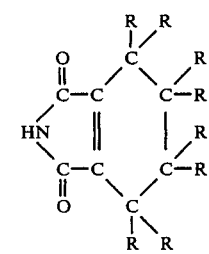

Formula VI wherein each R, $R^1$ and $R^2$ are independently hydrogen or a group which does not substantially inhibit free radical polymerization such as, for example, a halogen, particularly chlorine or bromine, or an alkyl group having from 1 to about 4 carbon atoms, mixtures thereof and the like. Particularly suitable tetrahydrophthalimides include 3a,4,7,7a-tetrahydro-1H-isoindole-1,3(2H)-dione, 4,5,6,7-tetrahydro-1H-isoindole-1,3(2H)-dione, 3a,4,7,7a-tetrahydro-4-methyl-1H-isoindole-1,3(2H)-dione, 3a4,5,7a-tetrahydro-1H-isoindole-1,3(2H)-dione, 3a,4,7,7a-tetrahydro-5-methyl-1H-isoindole-1,3(2H)-dione, 4,5,6,7-tetrahydro-4-methyl-1H-isoindole-1,3(2H)-dione, 3a,4,7,7a-tetrahydro-2-methyl-1H-isoindole-1,3(2H)-dione, 3a,4,7,7a-tetrahydro-2-methyl-1H-isoindole-1,3(2H)-dione, 3a,4,7,7a-tetrahydro-2,4-dimethyl-1H-isoindole-1,3(2H)-dione, 3a,4,7,7a-tetrahydro-5,6-dimethyl-1H-isoindole-1,3(2H)-dione, 4,5,6,7-tetrahydro-2-methyl-1H-isoindole-1,3(2H)-dione, 4,5,6,7-tetrahydro-5-methyl-1H-isoindole-1,3(2H)-dione, and the like.

Suitable dihydro-1H-isoindole-1,3(2H)-diones (dihydrophthalimides) which can be employed include those represented by the following formulas VII, VIII, IX or X

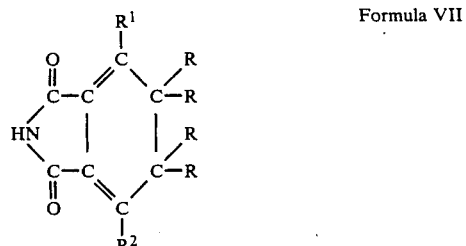

Formula VII

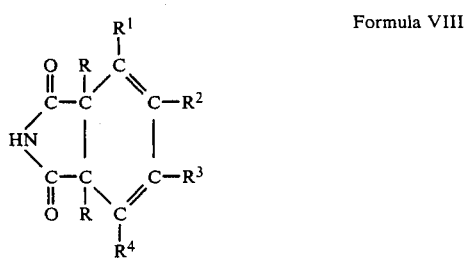

Formula VIII

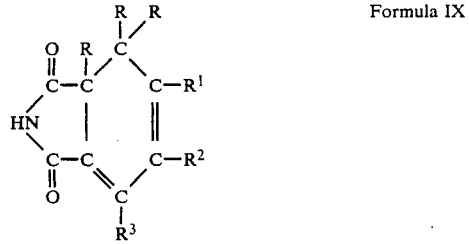

Formula IX

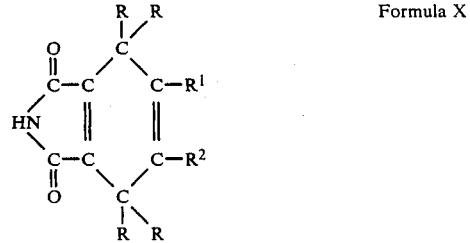

Formula X wherein each R, $R^1$, $R^2$, $R^3$ and $R^4$ are independently hydrogen or a group which does not substantially inhibit free radical polymerization such as, for example, a halogen, particularly chlorine or bromine, or an alkyl group having from 1 to about 4 carbon atoms, mixtures thereof and the like. Particularly suitable dihydrophthalimides include 3a,7a-dihydro-1H-isoindole-1,3(2H)-dione, cis-3a,7a-dihydro-1H-isoindole-1,3(2H)-dione, 3a,4-dihydro-1H-isoindole-1,3(2H)-dione, 4,7-dihydro-2-methyl-1H-isoindole-1,3(2H)dione and the like.

Suitable compounds containing only one phenolic hydroxyl group per molecule which can be employed herein include, for example, those represented by the following formula XI

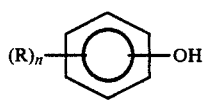
Formula XI wherein each R is independently hydrogen, a halogen, particularly chlorine or bromine, a hydrocarbyl or hydrocarbyloxy group having from about 1 to 20, preferably from about 1 to about 10 carbon atoms which can contain a substituent group such as, for example, a halogen, particularly chlorine or bromine, a nitro group, a methoxy group or an alkyl group having from 1 to about 9 carbon atoms, and the like, and n has a value from 1 to about 4.

Particularly suitable phenols include, for example, phenol, o-cresol, p-cresol, 4-ethylphenol, 4-propylphenol, 4-(tert-octyl)phenol, nonylphenol, chlorophenol, dichlorophenol, trichlorophenol, bromophenol, dibromophenol, tribromophenol, butylphenol, 4-isopropylphenol, 4-heptyloxyphenol, 3-n-pentadecylphenol, m-methoxyphenol, o-methoxyphenol, 2-methoxy-4-methylphenol, 4-ethyl-2-methoxyphenol, 3,4-methylenedioxyphenol, mixtures thereof and the like.

Suitable secondary amines which can be reacted with the vicinal epoxy containing compounds include, for example, those represented by the formula $HNR''_2$ wherein each R'' is independently a hydrocarbyl group having from 1 to about 20 carbon atoms which can contain substituent groups which does not substantially inhibit free radical polymerization. Particularly suitable secondary amines include, for example, diethylamine, dipropylamine, dibutylamine, dihexylamine, dioctylamine, diethanolamine, methylethanolamine, ethylethanolamine, bis(methoxyethyl)amine, bis(methoxypropyl)amine, bis(butoxyethyl)amine, bis(butoxypropyl)amine, bis(butoxybutyl)amine, any combination thereof and the like.

The mixture of polymerizable monomers at least one of which contains a carboxyl group is polymerized with the aforementioned reaction product of the epoxy-containing compound and imide and subsequently the phenolic hydroxyl containing compound or secondary amine at temperatures suitably from about 30° C. to about 200° C., more suitably from about 80° C. to about 130° C., most suitably from about 100° C. to about 120° C. for a time sufficient to polymerize the mixture and reduce the epoxide compound of the resultant product to not greater than about 1.5, preferably not greater than about 1, most preferably not greater than about 0.5, percent by weight. Usually a period of time of from about 0.5 to about 24, preferably from about 1 to about 6, more preferably from about 1.5 to about 3 hour(s) is suitable. The higher polymerization temperatures usually require less time whereas the lower reaction temperatures usually require longer polymerization times.

Suitable carboxylic acids having at least one polymerizable ethylenically unsaturated group include, acrylic acid, methacrylic acid, crotonic acid, tiglic acid, 2,4-hexanedienoic acid, itaconic acid, elaidic acid, erucic acid, citraconic acid, mesaconic acid, maleic acid, fumaric acid, mixtures thereof and the like.

Suitable polymerizable ethylenically unsaturated compounds free of acid (carboxyl) groups which can be used, include unsaturated aromatic compounds, unsaturated aliphatic compounds, alkylacrylates, alkylmethacrylates, hydroxyalkylacrylates, hydroxyalkylmethacrylates, unsaturated nitriles, unsaturated amides, combinations thereof and the like. Particularly suitable polymerizable materials include styrene, vinyl toluene, divinyl-benzene, isoprene, conjugated butadiene, alpha-methylstyrene, methyl methacrylate, butadiene, acrylonitrile, methacrylonitrile, vinyl chloride, vinylidene chloride, vinyl acetate, isobutylene, chloroprene, methylacrylate, ethylacrylate, butylacrylate, 2-ethylhexylacrylate, 2-hydroxyethyl acrylate, methylmethacrylate, ethylmethacrylate, butylmethacrylate, 2-ethylhexylmethacrylate, acrylamide, methacrylamide, mixtures thereof and the like.

If desired, the polymerization can be conducted in the presence of a suitable free radical polymerization catalyst such as for example, peroxide and azo-catalysts. Particularly suitable such catalysts include, for example, benzoylperoxide, t-butylperbenzoate, ditertiarybutylperoxide, azobisisobutyronitrile, t-butylazo-2-cyano-4-methylpentane, t-butylazo-2-phenylpropane, mixtures thereof and the like.

The polymerization catalyst is employed in any quantity which will cause the mixture to polymerize sufficiently; however, usually from about 0.05 to about 15, preferably from about 0.1 to about 8, more preferably from about 0.5 to about 4, most preferably from about 0.5 to about 2, percent by weight of catalyst based on the weight of addition polymerizable monomer(s) is employed.

The primary amine, secondary amine, tertiary amine, alkali metal hydroxide, alkali metal carbonate or alkali metal bicarbonate is reacted at temperatures usually from about 25° C. to about 200° C., preferably from about 50° C. to about 100° C. more preferably from about 60° C. to about 80° C. for a time sufficient to render the resultant product water miscible, water dispersable or water soluble.

The primary, secondary or tertiary amines or the alkali metal hydroxides, carbonates or bicarbonates are employed in an amount which is sufficient to render the resultant product water soluble, miscible or water dispersable. Particularly suitable amounts are from about 30 to about 100, more suitably from about 50 to about 90, most suitably from about 70 to about 90, percent by weight of such primary, secondary or tertiary amine or the alkali metal hydroxide, carbonate or bicarbonate per weight of carboxyl group in the grafted epoxy resin.

Suitable primary, secondary or tertiary amines which can be employed include, for example, those represented by the following formula XII

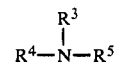
Formula XII wherein $R^3$, $R^4$ and $R^5$ are independently hydrogen or a hydrocarbyl or hydroxyl substituted hydrocarbyl group having from 1 to about 9, preferably from 2 to about 4 carbon atoms. Particularly suitable amines include ammonia, butylamine, dibutylamine, tributylamine, triethylamine, N,N-dimethylethanolamine, methyldiethanolamine, N-methylmorpholine, mixtures thereof and the like.

Particularly suitable alkali metal hydroxides, carbonates and bicarbonates are sodium hydroxide, potassium hydroxide, sodium carbonate, potassium carbonate, sodium bicarbonate, potassium bicarbonate, mixtures thereof and the like.

The compositions can be cured with any suitable curing agent such as, for example, urea-aldehyde resins, alkylated urea-aldehyde resins, melamine-aldehyde resins, alkylated melamine-aldehyde resins, phenol-aldehyde resins, alkylated phenol-aldehyde resins, blocked isocyanates, combinations thereof and the like. Particularly suitable curing agents include, for example, hexamethoxymethylmelamine, highly methylated melamine-formaldehyde resin, and highly alkylated methoxymethyl, isobutoxymethyl melamine-formaldehyde resin commercially available as CYMEL 303; CYMEL 325 and CYMEL 1161, respectively from the American Cyanamide Co.; RESIMENE 730 and RESIMENE 735 melamine-formaldehyde solutions commercially available from Monsanto Co.; BEETLE 60 and BEETLE 65 urea-formaldehyde resins commercially available from the American Cyanamide Co.; a mixture of the allyl ethers of mono-, di-, and tri-methylol phenols and a mixture of allyl ethers of methylol phenol partially polymerized, commercially available as METHYLON 75-108 and METHYLON 75-121 from BTL Specialty Resins Corp., mixtures thereof and the like. Suitable blocked isocyanates which can be employed herein as curing agents include, for example, those described in U.S. Pat. No. 3,959,106 to Bosso et al which is incorporated herein by reference in its entirety.

The curing agents are suitably employed in amounts sufficient to cure the resultant product into an insoluble and infusable substance. The curing agents are usually employed in amounts suitably from about 0.25 to about 50, more suitably from 1 to about 25, most suitably from about 3 to about 15, percent by weight based upon the weight of the primary amine, secondary amine, tertiary amine, alkali metal hydroxide, alkali metal carbonate or alkali metal bicarbonate reacted grafted epoxy resin.

If desired, catalyst promoters or accelerators can be employed with the urea-aldehyde resins, alkylated urea-aldehyde resins, melamine-aldehyde resins, alkylated melamine-aldehyde resins, phenol-aldehyde resins or alkylated phenol-aldehyde resins. Suitable such accelerators or promoters include, for example, phosphoric acid, polyphosphoric acid, maleic acid, citric acid, organic sulfonic acids such as for example, benzene sulfonic acid, p-toluene sulfonic acid, mixtures thereof and the like.

If desired, the coating composition can be formulated with conventional additives. Suitable such additives include, for example, antifoam agents, flow control agents, slip agents, adhesion promoters, flexibility promoters, surface tension modifiers, stress release agents, gloss reducing materials, rheology modifiers, stabilizers, surfactants, coalescing solvents, reactive diluents, plasticizers and the like. A partial list of suitable additives, include, for example, methacrylamide functional amine adduct of neopentyl(diallyl)oxy, tri(dioctyl)pyro-phosphato titanate which is commercially available from Kenrich Petrochemicals, Inc. as LICA 38J; methacrylamide functional amine adduct of neopentyl(diallyl)oxy, tri(dioctyl)pyro-phosphato zirconate which is commercially available from Kenrich petrochemicals, Inc. as LZ 38J; a solution of polyether modified methyl alkyl polysiloxanes which is commercially available from BYK-Chemie as BYK-321; a solution of polyether modified di-methyl polysiloxanes which is commercially available from BYK-Chemie as BYK-306; and a silicone resin solution which is commercially available as SR882M from General Electric.

The coating compositions can be pigmented and/or opacified with known pigments and opacifiers. For many uses, including food uses, the preferred pigment is titanium dioxide. Generally, the pigment is used in a pigment to binder ratio of from about 0.1:1 to about 1:1, by weight. Other pigments include, antimony oxide, zinc oxide, white lead, calcium carbonate, silica, aluminum silicate, magnesium silicate, aluminum potassium silicate, any combination thereof and the like.

The resulting aqueous coating compositions can be applied by any conventional method known in the coating industry. Therefore, spraying, rolling, dipping, flow control or electrodeposition applications can be employed for both clear and pigmented films. Spraying is the preferred technique. After application onto the substrate, the coating is thermally cured at temperatures of from about 95° C. to about 235° C. or higher, for periods in the range of from about 1 to 30 minutes. The resultant films can be dried at ambient temperatures for longer periods of time.

If desired, the coatings can contain relatively minor amounts of a coalescing solvent to promote film formation. Such solvents include, for example the glycol ethers and esters, such as, for example, ethylene glycol monobutyl ether (2-butoxyethanol), diethylene glycol monopropyl ether, diethylene glycol monobutyl ether, diethylene glycol monohexyl ether, propylene glycol monopropyl ether, propylene glycol monobutyl ether, propylene glycol tertiary butyl ether, propylene glycol isopropyl ether, dipropylene glycol monobutyl ether, ethylene glycol phenyl ether, propylene glycol phenyl ether, 2,2,4-trimethyl-1,3-pentanediol monoisobutyrate, n-pentyl propionate, $C_6$ to $C_{13}$ alkyl acetates, mixtures thereof and the like.

The compositions of the present invention can be applied as coatings to tin plate, aluminum, steel, metal coated with primers, plastics made from ABS, polyolefins, polyesters, polyamides and the like. The compositions are useful as coatings for the can, coil, automotive, marine and industrial maintenance industries. These compositions are particularly useful as low volatile organic content (VOC) containing coatings for the food and beverage can industries.

EXAMPLE 1

A. Reaction of epoxy compound with an unsaturated imide.

A diglycidyl ether of bisphenol A having an epoxide equivalent weight of 1755 (50.0 grams, 0.0285 equivalent) and 17.76 grams of 2-butoxyethanol (0.150 mole) are weighed into a four neck 500 ml glass flask equipped with a means for purging nitrogen, temperature control, stirring, condensing and reactant addition. After heating to 118° C., 0.970 gram of maleimide (0.010 mole), 1.967 grams methanol, and 0.448 gram of a 30 percent by weight solution of ethyl triphenylphosphonium phosphate in methanol catalyst are added to the reactor contents. 2-Butoxyethanol (0.772 gram, 0.0129 mole) is used to rinse the methanolic solution of maleimide and catalyst into the reactor. The temperature is then raised to 150° C. and maintained there for 15 minutes. The temperature is then raised to 166° C. and maintained there for 16 minutes. The resultant product is a dark reddish brown colored liquid.

B. Reaction of product from A with a secondary amine.

After cooling the product produced in A above to 122° C., 2.035 grams (0.01936 mole) of diethanolamine is added dropwise. 2-Butoxyethanol (1.037 grams, 0.0877 mole) is used to rinse all the diethanolamine into the reactor. The components are digested between 117 and 122° C. for 31 minutes. The resultant product has a calculated epoxide value of 0 percent by weight.

C. Polymerization of product from B with a mixture of a monomer containing only one polymerizable unsaturated group and only one carboxyl group per molecule.

After the temperature of the product produced in B above is lowered to 100° C., a monomer solution consisting of 9.631 grams (0.0925 mole) styrene, 8.420 grams (0.0978 mole) methacrylic acid and 0.1844 gram (0.0011 mole) of azobisisobutyronitrile polymerization catalyst is slowly added over a period of 57 minutes. After the monomer addition, 5.608 grams of n-butanol containing 0.0477 gram (0.0003 mole) azobisisobutyronitrile polymerization catalyst is added over a period of 28 minutes. The resultant product contains 6.2 percent acid by weight.

(D) Reaction of product produced in C above with a tertiary amine.

The temperature of the product produced in C above is lowered to 75° C. and an aqueous solution of N,N-dimethylethanolamine is added in a period of 8 minutes. The aqueous solution of N,N-dimethylethanolamine is prepared by mixing 8.244 grams of N,N-dimethyle-thanolamine (0.0925 mole) in 113.5 grams deionized water. An additional 176.9 grams of deionized water is added over a period of 24 minutes. The beige colored opaque dispersion with a non-volatile content of 20 percent is stirred an additional 38 minutes as it is allowed to cool. The volatile organic content of the aqueous dispersion is 2.2 pounds/gallon (264 grams/liter). The pH of the stable aqueous dispersion is 8.7. The aqueous dispersion is diluted to 10 percent by weight non-volatiles. The viscosity which is measured with a Ford Cup #4 is 40.5 seconds.

EXAMPLE 2

Coatings are prepared by blending 59.8 grams of the aqueous solution prepared in Example 1 after dilution to 10 percent by weight non-volatiles, with 0.177 grams of CYMEL TM 325 to give a formulation containing 5 phr CYMEL TM 325. The thickness of the coating is between 0.2 and 0.3 mils. CYMEL TM 325 is a high imino (—NH) melamine-formaldehyde resin which is commercially available from the American Cynamid Co.

The coatings are applied to 24 gauge (4 inches ×12 inches, 101.6 mm×304.8 mm) unpolished cleantreated cold rolled steel panels with a #52 wire wound rod according to ASTM D 4147-82. The coating is also applied to tin free steel can stock (5 inches ×11 inches, 127 mm×279.4 mm) with a #34 wire wound rod according to ASTM D 4147-82 for the water pasteurization resistance test. Before applying the coating, the tin free steel can stock is degreased by washing the panel with aromatic 100 followed by acetone. The washed panels are then blown with nitrogen and placed in an oven at 400° F. for about 5 minutes. The coated panels are baked in an oven at 400° F. (204.4° C.) for 10 minutes.

EXAMPLE 3

A diglycidyl ether of bisphenol A having an epoxide equivalent weight of 1755 (50.0 grams, 0.0285 equivalent) is weighed into a reactor of the type described in Example 1. Cis-1,2,3,6-tetrahydrophthalimide (1.726 grams, 0.0114 mole) is dissolved in 17.25 grams of 2-butoxyethanol (0.146 mole) and added to the reactor. After blending at 120° C. for 32 minutes, a solution consisting of 3.972 grams nonylphenol (0.0180 mole), 1.051 gram 2-butoxyethanol (0.00889 mole) and 0.448 gram of a 30 percent by weight solution of ethyl triphenylphosphonium phosphate in methanol (P1 catalyst) is added to the reactor contents. The temperature is then raised to 170° C. and maintained there for 63 minutes. The temperature is lowered to 100° C. Then a monomer solution consisting of 9.634 grams styrene (0.0925 mole), 8.408 grams methacrylic acid (0.0977 mole) and 0.189 gram of azobisisobutyronitrile (0.00115 mole) is slowly added over a period of 61 minutes. After the monomer addition, 5.650 grams of n-butanol containing 0.0484 gram azobisisobutyronitrile (0.0003 mole) is added over a period of 29 minutes. The reactor contents are allowed to digest for 33 minutes at 100° C. Then the temperature is lowered to 75° C., and an aqueous solution of N,N-dimethylethanolamine is added in a period of 12 minutes. The aqueous solution of N,N-dimethyl-ethanolamine is prepared by mixing 8.273 grams of N,N-dimethylethanolamine (0.0928 mole) in 143.8 grams deionized water. An additional 42.5 grams of deionized water is added and the white colored, opaque dispersion with a non-volatile content of 28 weight percent is stirred an additional 28 minutes as it is allowed to cool. The volatile organic content of the aqueous dispersion is 2.0 pounds/gallon (240 grams/liter). The aqueous dispersion is further diluted to 18 percent by weight non-volatiles. The pH of the stable aqueous dispersion is 8.5. The viscosity which is measured with a Ford Cup #4 is 82 seconds.

EXAMPLE 4

A diglycidyl ether of bisphenol A having an epoxide equivalent weight of 1755 (50.0 grams, 0.0285 equivalent) is weighed into a reactor of the type described in Example 1. Cis-1,2,3,6-tetrahydrophthalimide (1.737 grams, 0.0115 mole) is dissolved in 16.68 grams of 2-butoxyethanol (0.141 mole) and is added to the reactor. After blending at 120° C. for 35 minutes, a solution consisting of 1.914 grams nonylphenol (0.0180 mole), 1.024 grams 2-butoxy-ethanol (0.00889 mole) and 0.466 gram of a 30 percent by weight solution ethyl triphenyl-phosphonium phosphate in methanol (P1 catalyst) is added to the reactor contents. The temperature is raised to 170° C. and is maintained there for 61 minutes. The temperature is then lowered to 118° C. A solution of 0.995 gram diethanolamine (0.00947 mole) and 0.975 gram 2-butoxyethanol (0.00825 mole) is added dropwise to the reactor contents and the temperature is maintained at 118° C. for 27 minutes. Then the temperature is adjusted to 100° C. and a monomer solution consisting of 9.638 grams styrene (0.0925 mole), 8.499 grams methacrylic acid (0.0987 mole) and 0.182 gram of azobisisobutyronitrile (0.00111 mole) is slowly added over a period of 46 minutes. After the monomer addition, 5.611 grams of n-butanol containing 0.0456 gram azobisisobutyronitrile (0.00028 mole) is added over a period of 44 minutes. The reactor contents are allowed to digest for 20 minutes at 100° C. Then the temperature is lowered to 75° C., and an aqueous solution of N,N-dimethylethanolamine is added in a period of 18 minutes. The aqueous solution of N,N-dimethylethanolamine is prepared by mixing 8.299 grams of N,N-dimethylethanolamine (0.0931 mole) in 144.1 grams deionized water. An additional 290.5 grams of deionized water is added over a period of 37 minutes between 63° C. and 80° C. The resultant white colored, opaque dispersion with a nonvolatile content of 15 weight percent is stirred an additional 46 minutes as it is allowed to cool. The volatile organic content of the aqueous dispersion is 2.0 pounds/gallon (240 gram/liter). The aqueous dispersion is diluted further to 8 percent by weight non-volatiles. The pH of the stable aqueous dispersion is 8.6. The viscosity which is measured with a Ford Cup #4 is about 124 seconds.

EXAMPLE 5

A diglycidyl ether of bisphenol A having an epoxide equivalent weight of 1755 (50.0 grams, 0.0285 equivalent) is weighed into a reactor of the type described in Example 1. Cis-1,2,3,6-tetrahydrophthalimide (4.441 grams, 0.0294 mole) is dissolved in 16.67 grams of warm 2-butoxyethanol (0.141 mole) and is added to the reactor. After blending between 120° C. and 134° C. for 30 minutes, 0.442 gram of a 30 percent by weight solution of ethyl triphenyl-phosphonium phosphate in methanol (P1 catalyst) is added to the reactor contents. The temperature is raised to 130° C. and is maintained there for 21 minutes. The temperature is then lowered to 100° C. where a monomer solution consisting of 9.628 grams styrene (0.0924 mole), 8.392 grams methacrylic acid (0.0975 mole) and 0.183 gram of azobisisobutyronitrile (0.0011 mole) is slowly added over a period of 63 minutes. After the monomer addition, 5.682 grams of n-butanol containing 0.0453 gram azobisisobutyronitrile (0.00028 mole) is added over a period of 40 minutes. The gray and opaque reactor contents are allowed to digest for 18 minutes at 100° C. Then the temperature is lowered to 75° C., and an aqueous solution of N,N-dimethylethanolamine is added to the reactor contents. The aqueous solution of N,N-dimethylethanolamine is prepared by mixing 8.251 grams of N,N-dimethylethanolamine (0.0926 mole) in 155.3 grams deionized water. An additional 144.5 grams of deionized water is added over a period of 24 minutes and the white colored, opaque reactor contents with a non-volatile content of 20 weight percent is stirred an additional 17 minutes as it is allowed to cool. The volatile organic content of the aqueous dispersion is 1.9 pounds/gallon (228 grams/liter). The aqueous dispersion is further diluted to 10 weight percent non-volatiles. The pH of the stable aqueous dispersion is 8.1. The viscosity which is measured with a Ford Cup #4 is 73 seconds.

EXAMPLE 6

A diglycidyl ether of bisphenol A having an epoxide equivalent weight of 1755 (50.0 grams, 0.0285 equivalent) is weighed into a reactor of the type described in Example 1. Cis-1,2,3,6-tetrahydrophthalimide (1.727 grams, 0.0114 mole) is dissolved in 16.71 grams of 2-butoxyethanol (0.141 mole) and is added to the reactor. After blending at 120° C. for 30 minutes, a solution consisting of 1.01 grams 2-butoxyethanol and 0.460 gram of a 30 percent by weight solution of ethyl triphenylphosphonium phosphate in methanol (P1 catalyst) is added to the reactor contents. The temperature is raised to 130° C. and is maintained between 127° C. and 140° C. for 31 minutes. The temperature is then lowered to 100° C. and a monomer solution consisting of 9.625 grams styrene (0.0924 mole), 8.419 grams methacrylic acid (0.0978 mole) and 0.190 gram of azobisisobutyronitrile (0.0012 mole) is slowly added over a period of 52 minutes. After the monomer addition, 5.624 grams of n-butanol containing 0.0470 gram azobisisobutyronitrile (0.00029 mole) is added over a period of 29 minutes. The reactor contents are allowed to digest for 27 minutes at 100° C. Then the temperature is lowered to 75° C., and an aqueous solution of N,N-dimethylethanolamine is added to the gray reactor contents over a period of 21 minutes. The aqueous solution of N,N-dimethylethanolamine is prepared by mixing 8.242 grams of N,N-diemthylethanolamine (0.0925 mole) in 108.2 grams deionized water. An additional 180.0 grams of deionized water is added over a period of 21 minutes. The temperature is raised to 90° C. where 136.1 grams of more deionized water is added to the reactor contents over a period of 14 minutes. The white colored, opaque dispersion with a non-volatile content of 14.8 weight percent is stirred as it is allowed to cool. The pH of the stable aqueous dispersion is 8.8. The volatile organic content of the dispersion is 2.0 pounds/gallon (240 grams/liter).

EXAMPLE 7

A bisphenol A epoxy resin with an epoxide equivalent weight of 1755 (50.0 grams, 0.0285 equivalent) is weighed into a reactor of the type described in Example 1. Cis-1,2,3,6-tetrahydrophthalimide (1.729 grams, 0.0114 mole) is dissolved in 16.67 grams of 2-butoxyethanol (0.141 mole) and is added to the reactor. After blending between 115° C. and 120° C. for 28 minutes, a solution consisting of 4.012 grams nonylphenol (0.0182 mole), 1.023 grams 2-butoxyethanol (0.00866 mole) and 0.453 gram of a 30 percent by weight solution of ethyl triphenylphosphonium phosphate in methanol (P1 catalyst) is added to the reactor contents. The temperature is raised to 170° C. and maintained there for 34 minutes. The temperature is then lowered to 100° C. Then a monomer solution consisting of 9.641 grams styrene (0.0926 mole), 8.392 grams methacrylic acid (0.0975 mole) and 0.0179 gram of azobisisobutyronitrile (0.00011 mole) is slowly added over a period of 66 minutes. After the monomer addition, 5.620 grams of n-butanol is added and the reactor contents are allowed to digest over a period of 56 minutes. The temperature is lowered to 75° C., and an aqueous solution of N,N-dimethylethanolamine is added in a period of 24 minutes. The aqueous solution of N,N-dimethylethanolamine is prepared by mixing 8.243 grams of N,N-dimethylethanolamine (0.0925 mole) in 91.7 grams deionized water. An additional 175.1 grams of deionized water is added over a period of 27 minutes. The white colored opaque dispersion with a non-volatile content of 22 percent is stirred an additional 44 minutes as it is allowed to cool. The pH of the stable aqueous dispersion is 7.9. The viscosity which is measured with a Ford Cup No. 4 is 21 seconds.

Methyl Ethyl Ketone (MEK) Resistance

The resistance of the cured coating to removal with methyl ethyl ketone is determined by rubbing across the baked panels a two pound ball pien hammer with the ball end covered with eight layers of cheesecloth which has been saturated with methyl ethyl ketone (MEK). No force is applied to the hammer other than that necessary to guide the hammer back and forth over the same area. A forward and reverse stroke returning to the starting point is considered as being one MEK double rub. Twenty-five double rubs are considered a pass.

Pencil Hardness

This is determined by the procedure defined in *Paint Testing Manual* by H. A. Gardner and G. G. Sward in the 12th Ed. (1962), pp. 131–132. One part is modified. When the coating is broken to the metal surface constitutes a failure. The results reported are a pencil hardness that does not break the film, but the next pencil grade does break the film.

Tape Adhesion

Adhesion of the cured coated panels are measured by the tape test described in ASTM D3359-83, method A. The tape used is SCOTCH TM 610 tape.

T-Bend

T-bend is used as a measure of the flexibility of the coating. The edges of the panel are cut to leave a two inch (50.8 mm) wide specimen of uniform thickness. A bend is made in the panel at approximately 0.75 inches (19.05 mm) from the end using a fingerbrake. The bent specimen is then placed in a vice, which is previously taped with plastic tape to prevent scratching the substrate, and the panel is bent back on itself to obtain a 180 degree bend. The stressed area is then tested for adhesion by taping with SCOTCH TM 610 tape. After assuring that there are no air bubbles under the tape, the tape is then pulled with a rapid and a forceful fashion at a 90 degree angle in an attempt to pull the coating away from the substrate. Next, a solution of copper sulfate in 0.1 N hydrochloric acid is applied to the stressed area. The purpose of this step is to oxidize any resulting exposed bare metal in order to more accurately observe adhesive failures. The specimen is examined under a 30× powered microscope to determine failure. The first bend is noted as T0 because there is no panel sandwiched between the bend. The process of bending the panel by using the fingerbrake and vice is continued until there is no sign of cracking or adhesion loss. Each successive bend is noted as T1, T2, T3, T4, etc. because of the number of layers of panel sandwiched between plys. The lower the number of T-bends, the better the flexibility.

Reverse Impact

Coated panels are subjected to the impact of a falling weight from a Gardner Impact Tester at different calibrated heights ranging from 0 to 160 inch-pounds. The impacted area is then tested for adhesion by taping with SCOTCH TM 610 tape. The tape is applied in such a manner that no air bubbles are trapped under the tape. The tape is then pulled with a rapid and forceful fashion at a 90 degree angle in an attempt to pull the coating away from the substrate. Next, a solution of copper sulfate in 0.1 N hydrochloric acid is applied to the impacted area to check for failure.

Water Pasteurization Resistance

Water pasteurization resistance is performed on a single specimen for each coating to determine the permeability of the coating to water with pressure and heat. The width of each specimen is about 12 centimeters while the length is about 5 centimeters. A mold and the Gardner Impacter Tester are used to form a semi-circular bend across each specimen. The semi-circular bend is used to simulate a stressed area. A dart impacter rod is dropped from 140 inch-lbs for all the specimens when forming the bend. The specimens are then placed in a Model 8100-TD NORCO Autoclave with deionized water for 90 minutes at 121° C. (250° F.) and 1 bar (15 psi) pressure. The clock is only started after both the desired temperature and pressure are reached. After the specimens are pasteurized for the prescribed conditions, the heat is turned off, the pressure bled off and the panels removed for testing. Testing of the coated panels is performed within fifteen minutes of removal from the autoclave so that the data would not be influenced by the water leaving the coating. The specimens are blotted dry after removal from the autoclave with a paper towel. The specimens are rated for adhesion. Adhesion is determined by using the tape test described in method A of ASTM D3359-83. The tape is SCOTCH TM 610 tape. X-Cuts are made in the stressed and non-stressed areas of each specimen. No peeling or removal of the coating from the substrate is observed.

The following tables show the tests performed on the resultant coated panels from Example 2 and the result of the tests.

TABLE I

FILM PERFORMANCE OF AQUEOUS DISPERSIONS ON UNTREATED COLD ROLLED STEEL (24 GAUGE) BAKED AT 400° F. FOR 10 MIN., CROSSLINKED WITH CYMEL TM 325

| PHR | MEK DR | PENCIL HARD-NESS | TAPE ADHESION[a] | T-BEND | REVERSE IMPACT (in-lb) |
|---|---|---|---|---|---|
| 3.0 | 35 | 3H | 5A(2) | T3 | 104 |

[a]Nomenclature from ASTM method D3359-83 where 5A means no peeling or removal of coating and the value in the parenthesis is the number of replicates.

TABLE II

FILM PERFORMANCE OF AQUEOUS DISPERSIONS ON TIN FREE STEEL CAN STOCK BAKED AT 400° F. FOR 10 MIN., CROSSLINKED WITH CYMEL TM 325

| PHR | MEAN THICKNESS (mils) | WATER PASTEURIZATION ADHESION[a] |
|---|---|---|
| 3.0 | 0.16 | 5A |

[a]Nomenclature from ASTM method D3359-83 where 5A means no peeling or removal of coating.

What is claimed is:

1. An uncured composition which is the composition resulting from
(1) reacting
   (a) a compound containing an average of more than one vicinal epoxide group per molecule with
   (b) at least one unsaturated imide having a reactive hydrogen atom attached to the imide nitrogen atom
   in amounts which provide a ratio of moles of component (b) per epoxide group contained in component (a) of from about 0.01:1 to less than about 1:1; and
(2) reacting the product of step (A) with
   (c) at least one of
      (i) at least one compound containing only one phenolic hydroxyl group,
      (ii) at least one secondary amine, or
      (iii) a combination of (i) and (ii)
      in an amount such that the resulting product contains a percent epoxide value of not greater than about 1.5 percent by weight.

2. An uncured composition of claim 1 wherein
(i) components (a) and (b) are employed in amounts which provide a ratio of moles of component (b) per epoxide group contained in component (a) of from about 0.01:1 to about 0.9:1; and
(ii) component (c) is employed in an amount such that the resulting product contains a percent epoxide value of not greater than about 1 percent by weight.

3. An uncured composition of claim 1 wherein
(i) components (a) and (b) are employed in amounts which provide a ratio of moles of component (b) per epoxide group contained in component (a) of from about 0.1:1 to about 0.45:1; and
(ii) component (c) is employed in an amount such that the resulting product contains a percent epoxide value of not greater than about 0.50 percent by weight.

4. An uncured composition of claim 1 wherein
(i) components (a) and (b) are employed in amounts which provide a ratio of moles of component (b) per epoxide group contained in component (a) of from about 0.1:1 to about 0.25:1; and
(ii) component (c) is employed in an amount such that the resulting product contains a percent epoxide value of not greater than about 0.25 percent by weight.

5. An uncured composition of claim 1, 2, 3 or 4 wherein
(i) component (a) is a di- or polyglycidyl ether of a compound having an average of more than one aromatic hydroxyl group per molecule;
(ii) component (b) is one or more of the compounds represented by the following formulas I, II, III, IV, V, VI, VII, VIII, IX or X

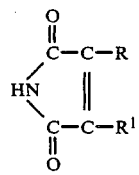

Formula I or

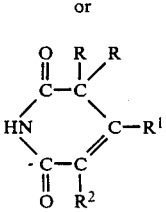

Formula II

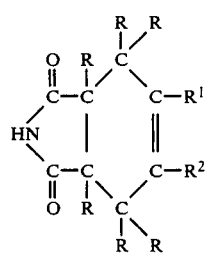

Formula III or

-continued

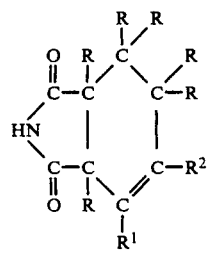

Formula IV or

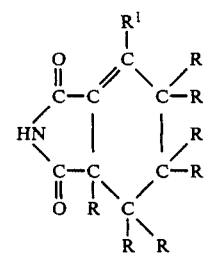

Formula V

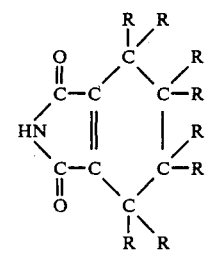

Formula VI

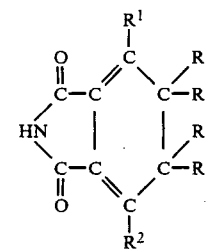

Formula VII

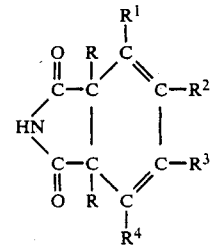

Formula VIII

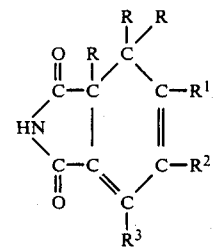

Formula IX

-continued

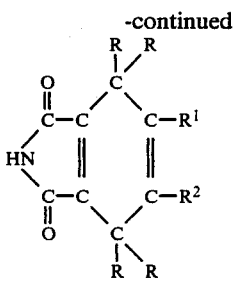

Formula X wherein each R, R¹, R², R³ and R⁴ are independently hydrogen or a group which does not substantially inhibit free radical polymerization;

(iii) component (c-i) is a compound represented by the following formula XI

Formula XI wherein each R is independently hydrogen, a halogen, a hydrocarbyl or hydrocarbyloxy group having from about 1 to 20 carbon atoms or such hydrocarbyl or hydrocarbyloxy groups which contain halogen, nitro, methoxy or alkyl group having from 1 to about 20 carbon atoms as a substituent group; and n has a value from 1 to about 4; and (iv) component (c-ii) is a secondary amine represented by the formula $HNR''_2$ wherein each R'' is independently a hydrocarbyl group having from 1 to about 20 carbon atoms which can contain substituent groups which does not substantially inhibit free radical polymerization.

6. An uncured composition of claim 5 wherein
(i) component (a) is a diglycidyl ether of a bisphenol;
(ii) component (b) is a compound represented by formula I or III; and
(iii) component (c) is an alkanolamine or a phenol wherein each R is independently hydrogen, chlorine, bromine, a hydrocarbyl group containing from about 1 to about 10 carbon atoms or such hydrocarbyl groups containing chlorine, bromine, nitro, hydroxyl, methoxy, or an alkyl group having from 1 to about 4 carbon atoms substituent groups.

7. An uncured composition of claim 6 wherein
(i) component (a) is a diglycidyl ether of bisphenol A;
(ii) component (b) is maleimide, cis-1,2,3,6-tetrahydrophthalimide; and
(iii) component (c) is diethanolamine or nonylphenol.

8. An uncured composition which is the product resulting from the free radical polymerization of
(A) the composition resulting from
 (1) reacting
  (a) a compound containing an average of more than one vicinal epoxide group per molecule with
  (b) at least one unsaturated imide having a reactive hydrogen atom attached to the imide nitrogen atom
  in amounts which provide a ratio of moles of component (b) per epoxide group contained in component (a) of from about 0.01:1 to about 1.1:1; and
 (2) optionally, reacting the product of step (A) with
  (c) at least one of
   (i) at least one compound containing only one phenolic hydroxyl group,
   (ii) at least one secondary amine, or
   (iii) a combination of (i) and (ii)
   in an amount sufficient that the resulting product contains a percent epoxide value of not greater than about 1.5 percent by weight; and
(B) a mixture of
 (d) at least one polymerizable monomer containing only one polymerizable ethylenically unsaturated group and only one carboxyl group per molecule
 (e) at least one polymerizable monomer containing only one polymerizable ethylenically unsaturated group per molecule and which is free of carboxyl groups;
wherein component (A) is present in an amount of from about 25 to about 95 percent by weight based upon the combined weight of components (A) and (B); component (B) is present in an amount of from about 75 to about 5 percent by weight based upon the combined weight of components (A) and (B); component (d) is present in an amount such that the resultant composition has a percent acid by weight based upon the combined weight of components (A) and (B) of from about 1 to about 30 using 45 as the acid equivalent weight; and component (e) is present in an amount of from about 4 to about 75 percent by weight based upon the combined weight of components (A) and (B).

9. An uncured composition of claim 8 wherein
(i) components (a) and (b) are employed in amounts which provide a ratio of moles of component (b) per epoxide group contained in component (a) of from about 0.01:1 to about 0.9:1;
(ii) component (c) is employed in an amount sufficient that the resulting product contains a percent epoxide value of not greater than about 1 percent by weight;
(iii) component (A) is present in an amount of from about 25 to about 95 percent by weight based upon the combined weight of components (A) and (B);
(iv) component (B) is present in an amount of from about 75 to about 5 percent by weight based upon the combined weight of components (A) and (B);
(v) component (d) is present in an amount such that the resultant composition has a percent acid by weight based upon the combined weight of components (A) and (B) of from about 1 to about 30 using 45 as the acid equivalent weight; and
(vi) component (e) is present in an amount of from about 4 to about 75 percent by weight based upon the combined weight of components (A) and (B).

10. An uncured composition of claim 8 wherein
(i) components (a) and (b) are employed in amounts which provide a ratio of moles of component (b) per epoxide group contained in component (a) of from about 0.1:1 to about 0.45:1; thereby forming a composition containing greater than 1 percent epoxide by weight;
(ii) component (c) is employed in an amount sufficient that the resulting product contains a percent epoxide value of not greater than about 0.50 percent by weight;
(iii) component (A) is present in an amount of from about 50 to about 90 percent by weight based upon the combined weight of components (A) and (B);
(iv) component (B) is present in an amount of from about 50 to about 10 percent by weight based upon the combined weight of components (A) and (B);

(v) component (d) is present in an amount such that the resultant composition has a percent acid by weight based upon the combined weight of components (A) and (B) of from about 2 to about 15 using 45 as the acid equivalent weight; and (vi) component (e) is present in an amount of from about 8 to about 48 percent by weight based upon the combined weight of components (A) and (B).

11. An uncured composition of claim 8 wherein (i) components (a) and (b) are employed in amounts which provide a ratio of moles of component (b) per epoxide group contained in component (a) of from about 0.1:1 to about 0.25:1; thereby forming a composition containing greater than 1 percent epoxide by weight;

(ii) component (c) is employed in an amount sufficient that the resulting product contains a percent epoxide value of not greater than about 0.25 percent by weight;

(iii) component (A) is present in an amount of from about 70 to about 85 percent by weight based upon the combined weight of components (A) and (B);

(iv) component (B) is present in an amount of from about 30 to about 15 percent by weight based upon the combined weight of components (A) and (B);

(v) component (d) is present in an amount such that the resultant composition has a percent acid by weight based upon the combined weight of components (A) and (B) of from about 3 to about 8 using 45 as the acid equivalent weight; and (vi) component (e) is present in an amount of from about 12 to about 27 percent by weight based upon the combined weight of components (A) and (B).

12. An uncured composition of claim 8, 9, 10 or 11 wherein (i) component (a) is a di- or polyglycidyl ether of a compound having an average of more than one aromatic hydroxyl group per molecule;

(ii) component (b) is one or more of the compounds represented by the following formulas I, II, III, IV, V, VI, VII, VIII, IX or X

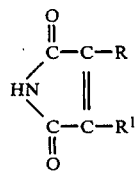

Formula I

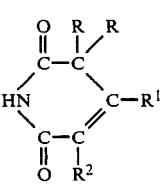

Formula II

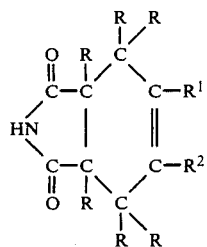

Formula III

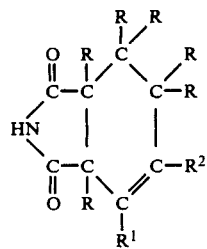

Formula IV

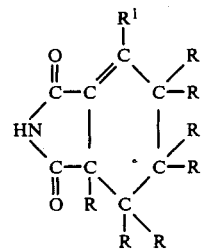

Formula V

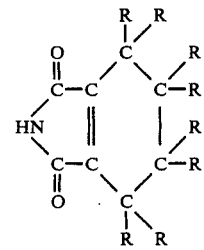

Formula VI

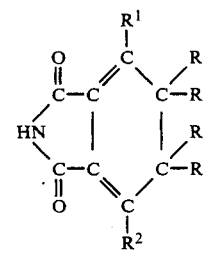

Formula VII

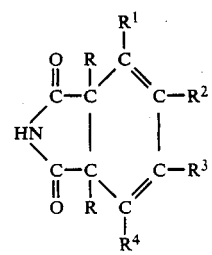

Formula VIII

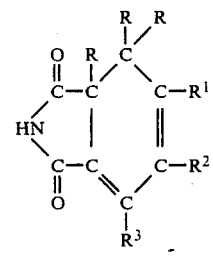

Formula IX

-continued

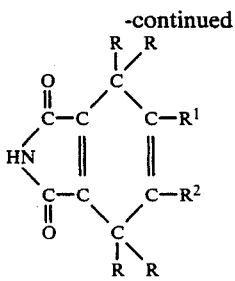
Formula X wherein each R, $R^1$, $R^2$, $R^3$ and $R^4$ are independently hydrogen or a group which does not substantially inhibit free radical polymerization;

(iii) component (c-i) is a compound represented by the following formula XI

Formula XI wherein each R is independently hydrogen, a halogen, a hydrocarbyl or hydrocarbyloxy group having from about 1 to 20 carbon atoms or a hydrocarbyl or hydrocarbyloxy group having from about 1 to 20 carbon atoms which contains a halogen, nitro, or a $C_1$ to $C_9$ alkyl or alkyloxy substituent group; and n has a value from 1 to about 4; and (iv) component (c-ii) is a secondary amine represented by the formula $HNR''_2$ wherein each R" is independently a hydrocarbyl group having from 1 to about 20 carbon atoms which can contain substituent groups which does not substantially inhibit free radical polymerization;

(v) component (d) is an aliphatic unsaturated carboxylic acid having from about 3 to about 24 carbon atoms; and (vi) component (e) is an unsaturated aromatic compound, unsaturated aliphatic compound, alkyl or hydroxyalkyl ester of an ethylenically unsaturated monocarboxylic acid, unsaturated nitrile, unsaturated amide or any combination thereof.

13. An uncured composition of claim 12 wherein
(i) component (a) is diglycidyl ether of a bisphenol;
(ii) component (b) is a compound represented by formula I or III; and
(iii) component (c) is an alkanolamine or a phenol wherein each R is independently hydrogen, chlorine, bromine, a hydrocarbyl group containing from about 1 to about 10 carbon atoms or such hydrocarbyl groups containing chlorine, bromine, nitro, hydroxyl, methoxy, or an alkyl group having from 1 to about 4 carbon atoms substituent groups.

14. An uncured composition of claim 13 wherein
(i) component (a) is a diglycidyl ether of bisphenol A;
(ii) component (b) is maleimide or cis-1, 2, 3, 6-tetrahydrophthalimide;
(iii) component (c) is diethanolamine or nonylphenol;
(iv) component (d) is methacrylic acid and;
(v) component (e) is styrene.

15. An uncured composition which is the product resulting from reacting
(I) the product resulting from the free radical polymerization of
(A) the composition resulting from
(1) reacting
(a) a compound containing an average of more than one vicinal epoxide group per molecule with
(b) at least one unsaturated imide having a reactive hydrogen atom attached to the imide nitrogen atom
in amounts which provide a ratio of moles of component (b) per epoxide group contained in component (a) of from about 0.01:1 to about 1.1:1; and
(2) optionally, reacting the product of step (A) with
(c) at least one of
(i) at least one compound containing only one phenolic hydroxyl group,
(ii) at least one secondary amine, or
(iii) a combination of (i) and (ii)
in an amount sufficient that the resulting product contains a percent epoxide value of not greater than about 1.5 percent by weight; and
(B) a mixture of
(d) at least one polymerizable monomer containing only one polymerizable ethylenically unsaturated group and only one carboxyl group per molecule
(e) at least one polymerizable monomer containing only one polymerizable ethylenically unsaturated group per molecule and which is free of carboxyl groups;
wherein component (A) is present in amounts of from about 25 to about 95 percent by weight based upon the combined weight of components (A) and (B); component (B) is present in amounts of from about 75 to about 5 percent by weight based upon the combined weight of components (A) and (B); component (d) is present in amounts such that the resultant composition has a percent acid by weight based upon the combined weight of components (A) and (B) of from about 1 to about 30 using 45 as the acid equivalent weight; and component (e) is present in an amount of from about 4 to about 75 percent by weight based upon the combined weight of components (A) and (B); and
(II) at least one of
(f) at least one primary, secondary or tertiary amine;
(g) at least one alkali metal hydroxide, alkali metal carbonate or alkali metal bicarbonate; or
(h) any combination of (f) and (g); and
wherein component (II) is present in an amount sufficient to render the resultant composition water miscible, water soluble or water dispersable.

16. An uncured composition of claim 15 wherein
(i) components (a) and (b) are employed in amounts which provide a ratio of moles of component (b) per epoxide group contained in component (a) of from about 0.01:1 to about 0.9:1;
(ii) component (c) is employed in an amount sufficient that the resulting product contains a percent epoxide value of not greater than about 1 percent by weight;
(iii) component (A) is present in an amount of from about 25 to about 95 percent by weight based upon the combined weight of components (A) and (B);
(iv) component (B) is present in an amount of from about 75 to about 5 percent by weight based upon the combined weight of components (A) and (B);

(v) component (d) is present in an amount such that the resultant composition has a percent acid by weight based upon the combined weight of components (A) and (B) of from about 1 to about 30 using 45 as the acid equivalent weight;

(vi) component (e) is present in an amount of from about 4 to about 75 percent by weight based upon the combined weight of components (A) and (B); and (vii) component (II) is employed in amounts of from about 30 to about 100 percent by weight based upon the amount of carboxyl group contained in component (I).

17. An uncured composition of claim 16 wherein
(i) components (a) and (b) are employed in amounts which provide a ratio of moles of component (b) per epoxide group contained in component (a) of from about 0.1:1 to about 0.45:1; thereby forming a composition containing greater than 1 percent epoxide by weight;
(ii) component (c) is employed in an amount sufficient that the resulting product contains a percent epoxide value of not greater than about 0.50 percent by weight;
(iii) component (A) is present in an amount of from about 50 to about 90 percent by weight based upon the combined weight of components (A) and (B);
(iv) component (B) is present in an amount of from about 50 to about 10 percent by weight based upon the combined weight of components (A) and (B);
(v) component (d) is present in an amount such that the resultant composition has a percent acid by weight based upon the combined weight of components (A) and (B) of from about 2 to about 15 using 45 as the acid equivalent weight;
(vi) component (e) is present in an amount of from about 8 to about 48 percent by weight based upon the combined weight of components (A) and (B); and
(vii) component (II) is employed in an amount of from about 50 to about 90 percent by weight based upon the amount of carboxyl groups contained in component (I).

18. An uncured composition of claim 17 wherein
(i) components (a) and (b) are employed in amounts which provide a ratio of moles of component (b) per epoxide group contained in component (a) of from about 0.1:1 to about 0.25:1;
(ii) component (c) is employed in an amount sufficient that the resulting product contains a percent epoxide value of not greater than about 0.25 percent by weight;
(iii) component (A) is present in an amount of from about 70 to about 85 percent by weight based upon the combined weight of components (A) and (B);
(iv) component (B) is present in an amount of from about 30 to about 15 percent by weight based upon the combined weight of components (A) and (B);
(v) component (d) is present in an amount such that the resultant composition has a percent acid by weight based upon the combined weight of components (A) and (B) of from about 3 to about 8 using 45 as the acid equivalent weight;
(vi) component (e) is present in an amount of from about 12 to about 27 percent by weight based upon the combined weight of components (A) and (B); and
(vii) component (II) is employed in an amount of from about 70 to about 90 percent by weight based upon the amount of carboxyl groups contained in component (I).

19. An uncured composition of claim 15, 16, 17 or 18 wherein
(i) component (a) is a di- or polyglycidyl ether of a compound having an average of more than one aromatic hydroxyl group per molecule;
(ii) component (b) is one or more of the compounds represented by the following formulas I, II, III, IV, V, VI, VII, VIII, IX or X

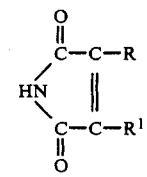

Formula I or

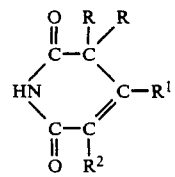

Formula II

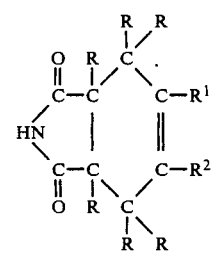

Formula III or

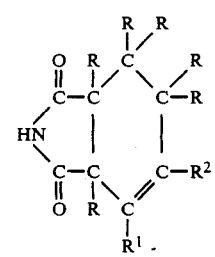

Formula IV or

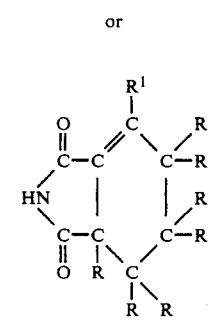

Formula V

-continued

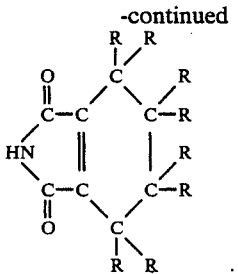 Formula VI

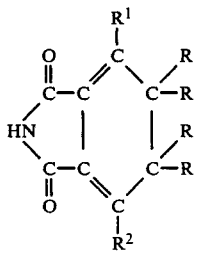 Formula VII

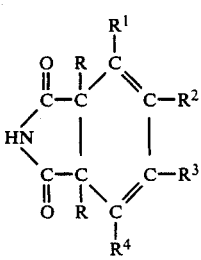 Formula VIII

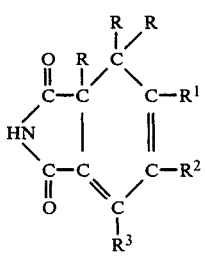 Formula IX

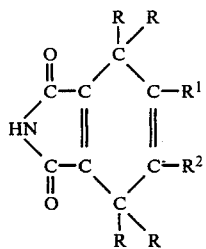 Formula X wherein each R, $R^1$, $R^2$, $R^3$ and $R^4$ are independently hydrogen or a group which does not substantially inhibit free radical polymerization;

(iii) component (c-i) is a compound represented by the following formula XI

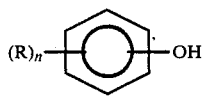 Formula XI wherein each R is independently hydrogen, a halogen, a hydrocarbyl or hydrocarbyloxy group having from about 1 to 20 carbon atoms or such hydrocarbyl or hydrocarbyloxy groups which contain halogen, nitro, methoxy or alkyl group having from 1 to about 20 carbon atoms as a substituent group; and n has a value from 1 to about 4;

(iv) component (c-ii) is a secondary amine represented by the formula $HNR''_2$ where each $R''$ is independently a hydrocarbyl group having from 1 to about 20 carbon atoms which can contain substituent groups which does not substantially inhibit free radical polymerization;

(v) component (d) is an aliphatic unsaturated carboxylic acid having from about 3 to about 24 carbon atoms;

(vi) component (e) is an unsaturated aromatic compound, unsaturated aliphatic compound, alkyl or hydroxyalkyl ester of an ethylenically unsaturated monocarboxylic acid, unsaturated nitrile, unsaturated amide or any combination thereof;

(vii) component (f) is a compound represented by the following formula XII

 Formula XII wherein $R^3$, $R^4$ and $R^5$ are independently hydrogen or a hydrocarbyl or hydroxyl substituted hydrocarbyl group having from 1 to about 9 carbon atoms; and (viii) component g is sodium hydroxide, potassium hydroxide, sodium carbonate, potassium carbonate, sodium bicarbonate, potassium bicarbonate, or any combination thereof.

20. An uncured composition of claim 19 wherein
(i) component (a) is a diglycidyl ether of a bisphenol;
(ii) component (b) is a compound represented by formula I or III; and
(iii) component (c) is an alkanolamine or a phenol wherein each R is independently hydrogen, chlorine, bromine, a hydrocarbyl group containing from about 1 to about 10 carbon atoms or such hydrocarbyl groups containing chlorine, bromine, nitro, hydroxyl, methoxy, or an alkyl group having from 1 to about 4 carbon atoms substituent groups; and
(iv) component (II) is a tertiary amine.

21. An uncured composition of claim 20 wherein
(i) component (a) is a diglycidyl ether of bisphenol A;
(ii) component (b) is maleimide or cis-1, 2, 3, 6-tetrahydrophthalimide;
(iii) component (c) is diethanolamine or nonylphenol;
(iv) component (d) is methacrylic acid;
(v) component (e) is styrene; and
(vi) component (II) is N,N-dimethylethanolamine.

22. A curable composition of claim 1, 2, 3, 4, 8, 9, 10, 11, 15, 16, 17 or 18 and a curing amount of a suitable curing agent or curing catalyst.

23. A curable composition of claim 22 wherein said curing agent is a melamine formaldehyde resin.

24. The product resulting from curing the composition of claim 23.

25. A curable composition of claim 5 and a curing amount of a suitable curing agent or curing catalyst.

26. A curable composition of claim 25 wherein said curing agent is a melamine formaldehyde resin.

27. The product resulting from curing the composition of claim 26.

28. A curable composition of claim 6 and a curing amount of a suitable curing agent or curing catalyst.

29. A curable composition of claim 28 wherein said curing agent is a melamine formaldehyde resin.

30. The product resulting from curing the composition of claim 29.

31. A curable composition of claim 7 and a curing amount of a suitable curing agent or curing catalyst.

32. A curable composition of claim 31 wherein said curing agent is a melamine formaldehyde resin.

33. The product resulting from curing the composition of claim 32.

34. A curable composition of claim 12 and a curing amount of a suitable curing agent or curing catalyst.

35. A curable composition of claim 34 wherein said curing agent is a melamine formaldehyde resin.

36. The product resulting from curing the composition of claim 35.

37. A curable composition of claim 13 and a curing amount of a suitable curing agent or curing catalyst.

38. A curable composition of claim 37 wherein said curing agent is a melamine formaldehyde resin.

39. The product resulting from curing the composition of claim 38.

40. A curable composition of claim 14 and a curing amount of a suitable curing agent or curing catalyst.

41. A curable composition of claim 40 wherein said curing agent is a melamine formaldehyde resin.

42. The product resulting from curing the composition of claim 41.

43. A curable composition of claim 19 and a curing amount of a suitable curing agent or curing catalyst.

44. A curable composition of claim 43 wherein said curing agent is a melamine formaldehyde resin.

45. The product resulting from curing the composition of claim 44.

46. A curable composition of claim 20 and a curing amount of a suitable curing agent or curing catalyst.

47. A curable composition of claim 46 wherein said curing agent is a melamine formaldehyde resin.

48. The product resulting from curing the composition of claim 47.

49. A curable composition of claim 21 and a curing amount of a suitable curing agent or curing catalyst.

50. A curable composition of claim 49 wherein said curing agent is a melamine formaldehyde resin.

51. The product resulting from curing the composition of claim 50.

* * * * *